Aug. 26, 1969  C. TROYANSKI  3,462,985
PLANE OF BEND SELECTOR
Filed Feb. 26, 1968  5 Sheets-Sheet 1
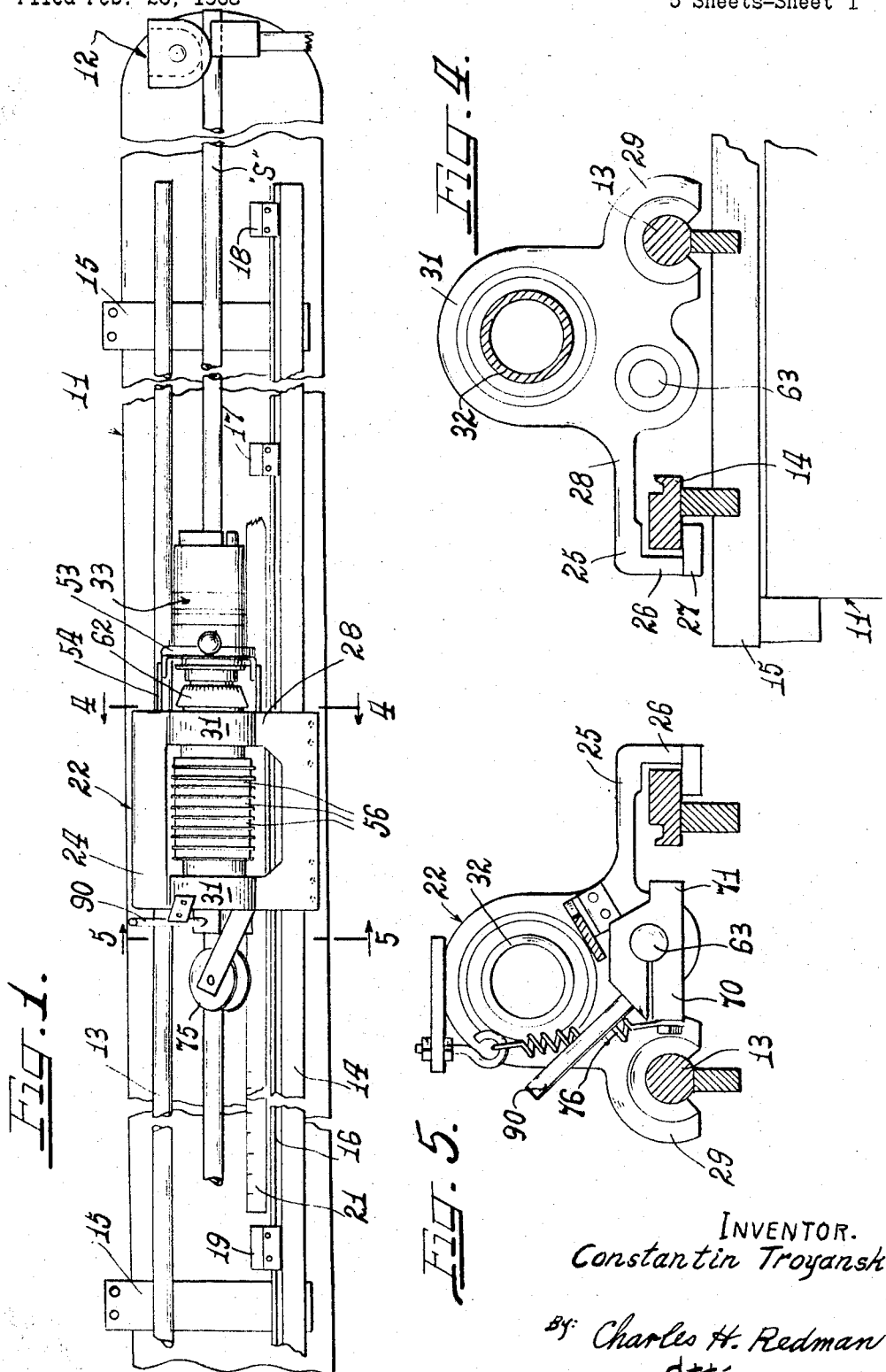
INVENTOR.
Constantin Troyanski.
BY: Charles H. Redman
Atty.

Aug. 26, 1969
C. TROYANSKI
3,462,985
PLANE OF BEND SELECTOR
Filed Feb. 26, 1968
5 Sheets-Sheet 2
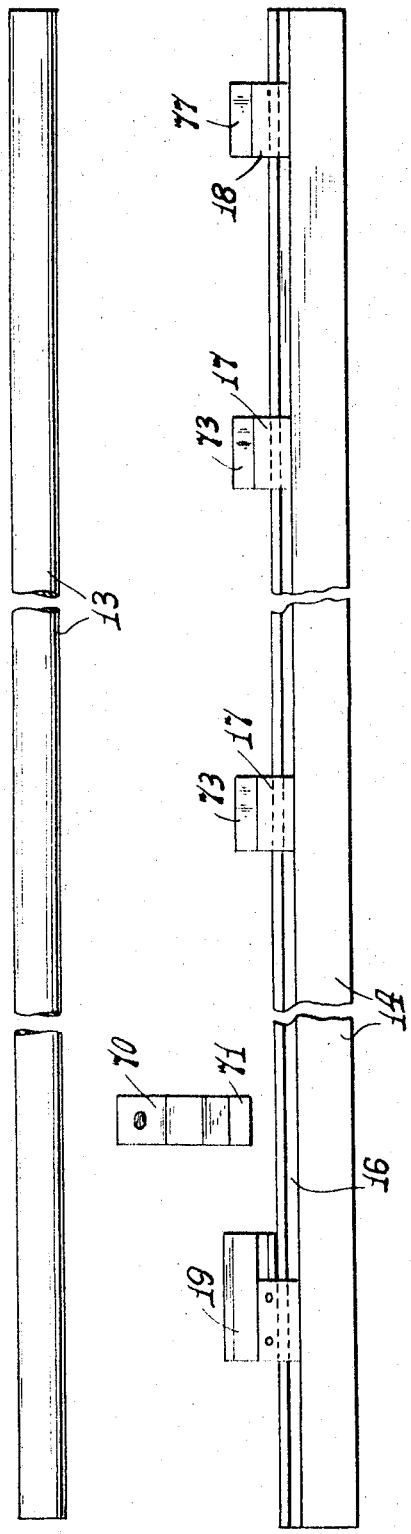
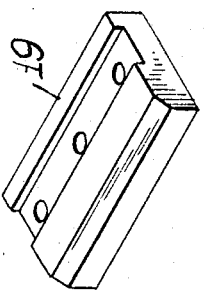
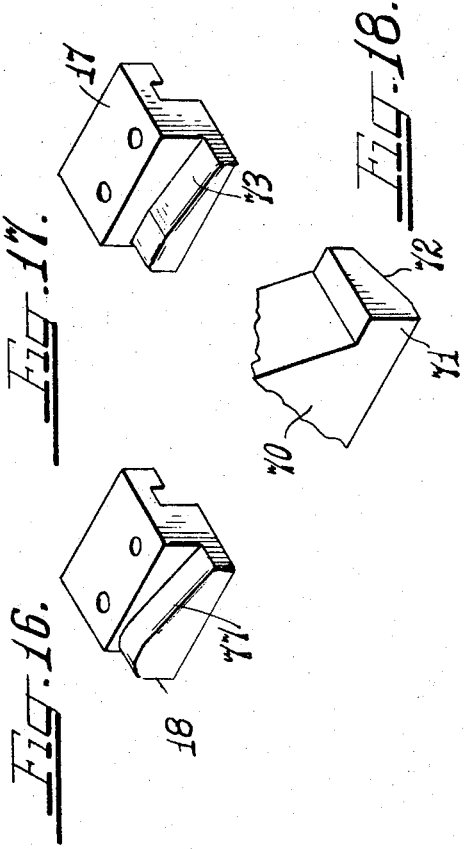
INVENTOR.
Constantin Troyanski
By Charles H. Redman
Atty.

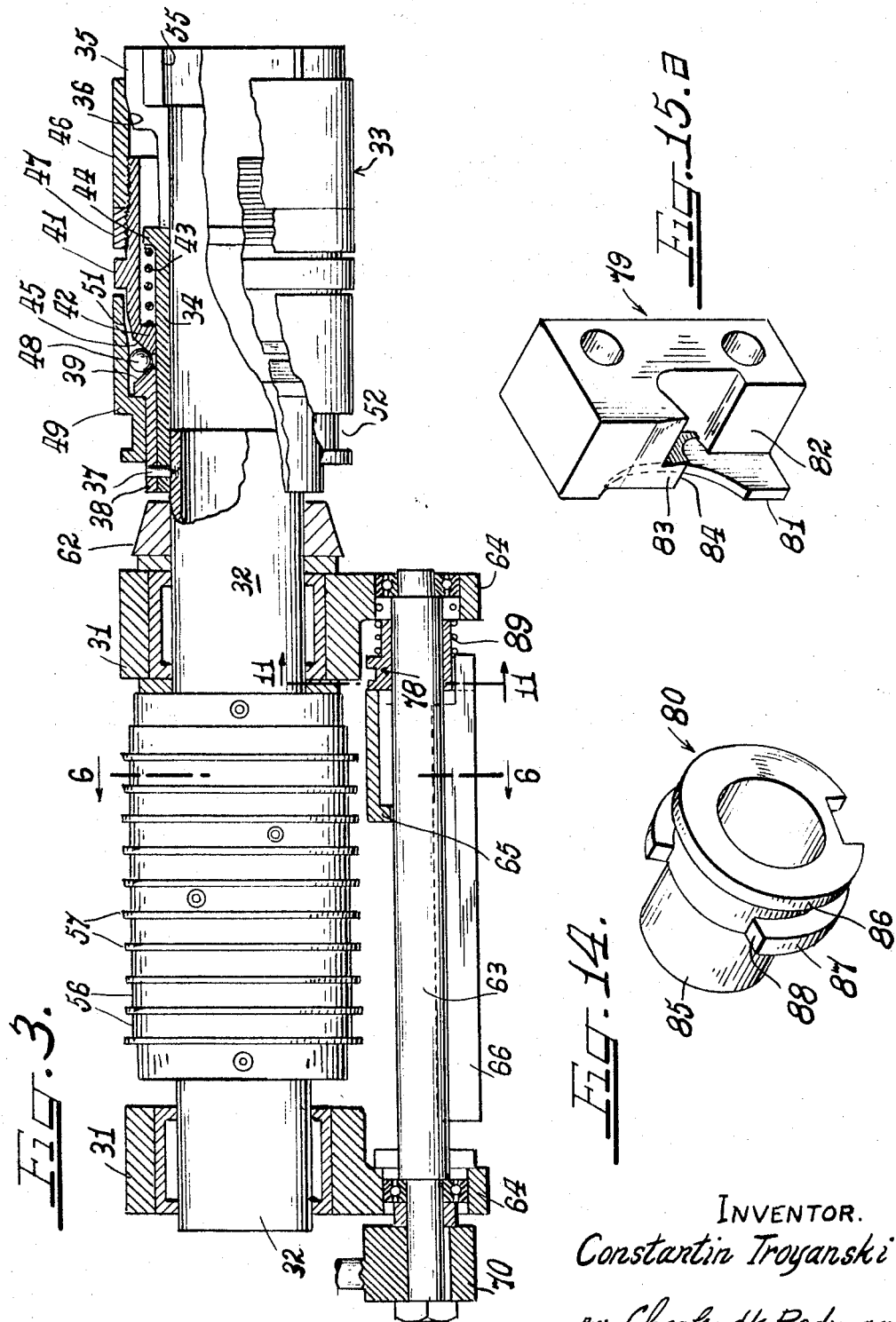

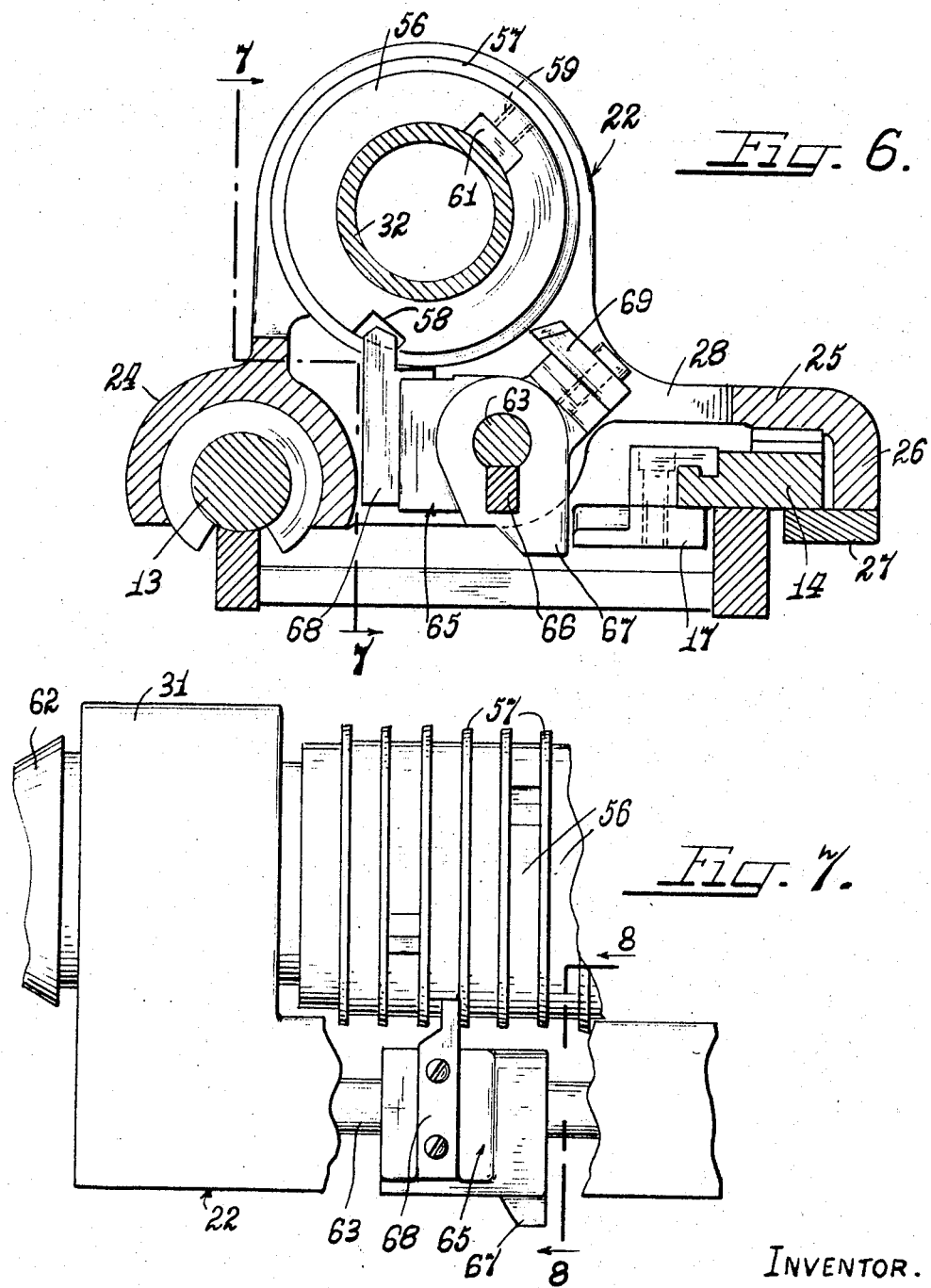

INVENTOR.
Constantin Troyanski.
By: Charles H. Redman
Atty.

United States Patent Office 3,462,985
Patented Aug. 26, 1969

3,462,985
PLANE OF BEND SELECTOR
Constantin Troyanski, Aurora, Ill., assignor to Pines Engineering Co., Inc., Aurora, Ill., a corporation of Illinois
Filed Feb. 26, 1968, Ser. No. 708,283
Int. Cl. B21j 7/26
U.S. Cl. 72—22                    10 Claims

ABSTRACT OF THE DISCLOSURE

Apparatus for indexing the spacing and plane of each of a plurality of bends to be performed by a bending machine on a length of tubular stock or the like.

---

This invention relates to improvements in tube bending machines and is particularly concerned with the novel construction and assembly of apparatus for indexing the plane and location of each of a plurality of bends to be performed in a length of tubular stock or the like. In performing a series of bends in the same or different planes in a length of stock, it is necessary to advance the stock toward the bending tools and to then rotate the stock a calculated distance so that the bending is accomplished in the desired plane. Heretofore, these adjustments of rotational location of the length of stock have been effected manually. This entails considerable effort and the ultimate accuracy of the bends performed in a multitude of like bent lengths of stock is questionable because of the calculations required preliminary to positioning successive lengths of stock for successive bends.

The bend-indexing apparatus herein disclosed is incorporated on the bending machine and it includes means to facilitate accurate rotation of the stock and automatically locking it in a predetermined position following the making of a preceding bend so that each successive bend of a plurality of bends in a single piece of stock are accurately determined and performed. The spacing between successive bends is also automatically determined during manual advance of the length of stock toward the bending tools. Thus, any number of lengths of stock may be successively bent into like configurations without requiring independent calculations for each length.

Otherwise stated, the apparatus functions when a length of stock is advanced predetermined distances to index means effective to limit the amount of rotation of the stock, either clockwise or counterclockwise, and lock it in position for the requisite performance of each of a plurality of bends.

It is, therefore, an object of this invention to provide novel apparatus of the character referred to herein.

Another object is to provide novel means for indexing a length of stock for the successive performance of a plurality of bends therein.

Another object is to provide novel means for limiting each advance of a length of stock toward the bending tools.

Another object of the invention is to provide, in an indexing apparatus, novel means to limit manual rotation of a length of stock in precise amounts.

Another object is to provide novel means for mounting a bend indexing apparatus on a bending machine.

Another object is to provide indexing mechanism of the character referred to with novel means to return an indexing element to its start position each time a required succession of bends has been performed in a given length of stock.

Another object is to provide indexing apparatus with novel indexing drums and cooperating indexing detents.

Another object of the invention is to provide apparatus of the character referred to which is not difficult or expensive to manufacture, is easy to operate, and is very efficient and accurate in use.

The structure by means of which the above noted and other objects and advantages of the invention are attained will be described in the following specification, taken in conjunction with the accompanying drawings, showing a preferred illustrative embodiment of the invention, in which:

FIG. 1 is a plan view of the indexing apparatus showing it mounted on a bending machine;

FIG. 2 is a plan view of the frame and indexing elements;

FIG. 3 is an enlarged side elevational view of the indexing carriage and related parts;

FIG. 4 is an end view of the carriage assembly, viewed along line 4—4 of FIG. 1, and omitting the chuck;

FIG. 5 is a view of the other end of the carriage assembly, viewed along line 5—5 of FIG. 1;

FIG. 6 is a transverse sectional view of the carriage assembly, taken substantially on line 6—6 of FIG. 3, showing the indexing slide in elevation;

FIG. 7 is an enlarged fragmentary side elevational view of the indexing carriage, taken substantially on line 7—7 of FIG. 6;

FIG. 14 is a perspective view of the indexing clutch sleeve;

FIG. 15a is a perspective view of the indexing clutch stop plate;

FIGS. 15b, 16 and 17 are perspective views of the various indexing stops carried by the frame; and, FIG. 18 is a fragmentary perspective view of the indexing cam.

Figure 8:
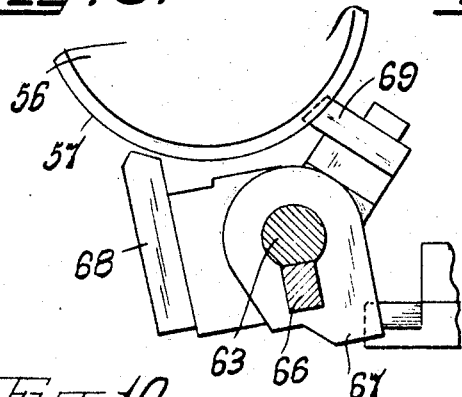
FIG. 8 is a view showing the indexing slide in disengaged position assumed while indexing, as viewed along line 8—8 of FIG. 7.
Figure 9:
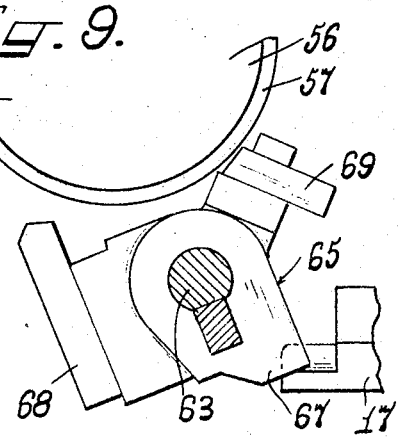
FIG. 9 is a view similar to FIG. 8, showing the indexing slide in the position assumed while being reset.
Figure 10:
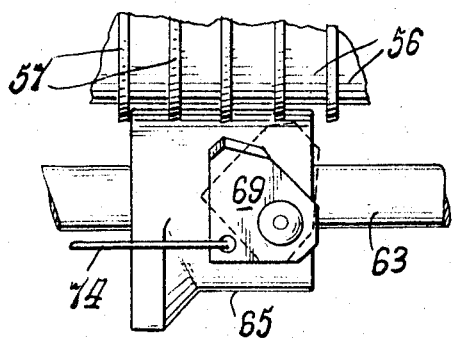
FIG. 10 is a top plan view of the indexing slide and associated index drums.
Figure 13:
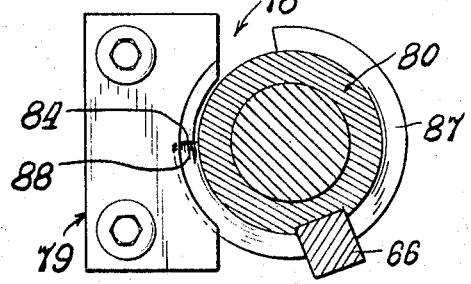
FIG. 13 is a view similar to FIG. 12, showing the indexing clutch locked for resetting of the indexing slide.
Figure 11:
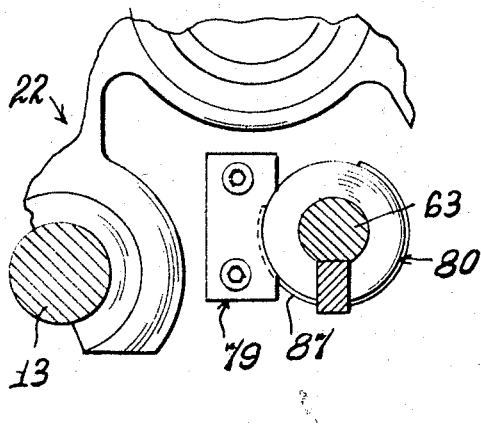
FIG. 11 is a sectional view taken on line 11—11 of FIG. 3, showing the indexing clutch.
Figure 12:
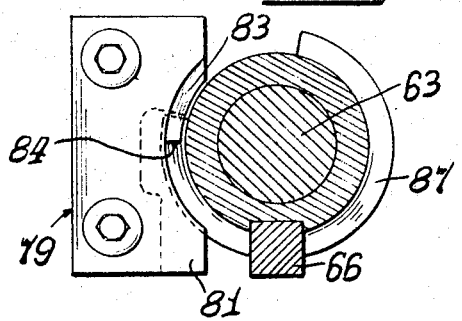
FIG. 12 is an enlarged view similar to FIG. 11 showing indexing clutch in normal position.

Referring to the exemplary disclosure of the plane of bend selector illustrated in the accompanying drawings, and particularly to FIG. 1, said selector is shown as being mounted on the top surface of the housing for a bending apparatus 11 having bending tools 12 at one end towards which a length of stock "S" is advanced for successive performance of a plurality of bends along the length thereof. For this purpose a guide rod 13 is arranged on the top surface of the housing and spaced laterally therefrom, but parallel thereto, is a guide bar or track 14. These two longitudinal guides are joined firmly, as by welding, to bed plates 15 to form a rigid guide frame. The guide frame is secured to the top surface of the machine frame by suitable clamps (not shown) so as to be adjustable bodily laterally on the machine frame to align the mechanism carried thereby with the bending tools 12.

The track 14 has a channel 16 on its upper marginal surface adjacent to the edge facing the parallel guide rod 13. This channel is adapted to receive in cooperation therewith, for adjustment along its length, a plurality of indexing cam lifters 17 and re-set stops 18 and 19 (FIGS. 15b, 16 and 17). For purposes of locating the cam lifters and stops along the guide, a calibrated measuring tape 21 is secured to the frame surface beneath said cams and stops. The purposes and functions of these cam lifters and stops will be described presently in conjunction with the description of the indexing apparatus 22 carried on and slidable along said guides 13 and 14.

As best shown in FIGS. 1, 3, 4 and 5, the indexing apparatus 22 is assembled in a carriage 24. This carriage is comprised generally of a laterally disposed base portion 25 that is seated upon and rides along the guide bar 14. It has depending edge portions 26 that carry clamp plates 27 which are engaged loosely beneath the guide bar to prevent removal of the carriage.

The carriage 24 also includes a pair of longitudinally spaced laterally extending portions 28 that are integral at one end with said laterally disposed base portion 25 and which bridge the gap between the two guides 13 and 14 and terminate in bearing elements 29 that embrace and slide along the guide rod 13. Each bridging portion 28 has formed therein a bearing journal 31. These bearing journals are in axial alignment with each other and a sleeve 32 is extended therethrough, the same being journalled therein in a manner to prevent its shifting longitudinally relative to the carriage but for free rotation in bearings 31.

The forward projecting end of said sleeve 32 carries a chuck assembly generally indicated at 33. Any suitable chuck assembly may be used but preferably, as best shown in FIG. 3, this assembly comprises a chuck element 34 that is secured firmly to the end of the sleeve and which has compressible chuck fingers 35 at its free end. The fingers have a cam surface 36 on their outside perimeter. Telescoped over the mounted end of the chuck element 34 and secured thereto by a pin 37 is a ring clamp 38 having an inwardly bevelled free edge 39. Also telescoped over the chuck element is a holder 41 having an internal flange 42 at its rearmost end against which a tension spring 43 bears. The other end of said spring bears against an external flange 44 on the chuck element so as to urge the holder 41 in a rearward direction at all times. When at its extreme rearward position, the outside surface of the flange abuts the bevelled edge 39 of the ring clamp 38. This end of the holder 41 is also bevelled, as at 45. The forward end of the holder is externally threaded to receive threaded thereon a chuck nut 46 having its free end internally tapered to cooperate with the cam surface on the chuck fingers. A lock nut 47 secures the chuck nut in an adjusted position so as to permit variance in the amount of clamping effected.

A series of spheres 48 is arranged in the V-channel formed by the bevelled surfaces 39 and 45 and these are surrounded by a collar 49 having an internal tapered surface 51. The collar has an external channel 52 into which is engaged the forked ends of a hand lever 53 (FIG. 1) pivotally mounted in a bracket 54 secured to the adjacent bridge portion 28.

When a tube end is thrust into the chuck, the lever 53 is rocked to slide the collar 49 in a forward direction camming the spheres into the V-channel so as to force the holder 41 in a forward direction and compress the chuck fingers tightly about the tube. When a tube of lesser diameter than the diameter of the chuck is inserted, a series of spacers 55 may be mounted one on each chuck finger 35. When the collar 49 is thrust forward it is held by the slant internal surface overlying the spheres to prevent their displacement outwardly radially. Thus, the tube is held firmly to the sleeve 32 and will rotate when said sleeve is rotated.

Rotation of the sleeve 32 and tube "S" is effected manually periodically preliminary to the performance of successive bends in different planes in the tube. The spacing between bends is determined by the successive positioning of the indexing apparatus longitudinally along the guides 13–14, and the plane of bend is determined by the direction and degree of rotation of the sleeve.

In use, the carriage 22 is manually positioned its furthest distance from the bending tools 12 preliminary to performance of a first bend in the tube "S." The required bend is formed and the carriage is moved forwardly toward the bending tools and, if required to generate a bend in a different plane than the preceding bend, the tube is rotated the requisite amount so as to position the tube for receiving such bend. This is repeated until the required number of bends are performed. Each advance of the carriage toward the bending tool actuates means to facilitate automatic indexing of the next bend.

This means is best shown in FIGS. 1 and 5 to 10 to which reference is now made. The sleeve 32 has mounted thereon, between the bearing journals 31 of the carriage, a series of drums 56 having a spacer flange 57 between each adjacent drum. These drums are alike and each has a recess 58 (FIG. 6) in its perimeter which functions in cooperation with indexing mechanism to be described, to limit manual rotation of the sleeve. The rotational position of each drum on the sleeve is preselected and they are then secured against independent rotation by set screws 59 that engage and urge pressure blocks 61 against the sleeve.

To facilitate selective positioning of the drums 56 so as to render them effective to accurately control the degree of rotation of the sleeve, and hence the plane of the bend to be performed, a protractor 62 (FIG. 1) is attached to the sleeve 32 rearwardly of the chuck 33. Thus, the sleeve can be rotated a precise degree preliminary to locking a selected drum thereto. In practice, the drum 56 closest to the front of the carriage is locked on the sleeve when the protractor is set at "zero." This will be representative of the first bend. Assuming that the next successive bend is to be in a plane at an angle of 45° from the first bend, the protractor is rotated to its 45° position and the second drum is then locked to the sleeve. This is repeated for each successive bend calculation, the protractor being first turned to the requisite degree while a drum is held against rotation, and the drum being then locked onto the sleeve.

The bend selector or indexing mechanism, best shown in FIGS. 5 to 10, is carried on a cam shaft 63 (FIG. 3) that is rotatable in bearings 64 carried by the bridging portion 28 of the carriage below and to one side of the drum carrying sleeve 32. Mounted on said shaft for free sliding between said bearings is latch means in the form of an indexing slider 65 that is keyed to the shaft by a key 66 so as to rotate with the shaft. The slider comprises a body having a downwardly projecting lug 67 adapted, in a manner to be explained presently, to cooperate with the reset stop 19 on the guide bar 14. The body mounts rigidly a finger 68 and a movable detent 69. The finger is disposed to normally seat in the recess 58 in one of the drums 56 for holding it in an indexed position. One end of the cam shaft 63 mounts firmly an indexing cam 70. As best shown in FIGS. 5 and 18, this indexing cam comprises a split body that is firmly secured to the shaft and which has a projection finger 71 formed on its bottom face with a cam surface 72.

At the initiation of the bend operations the finger 68 rests in the recess of the first drum (closest to chuck 33) to hold the sleeve 32 and tube "S" in a selected or "zero" position for the performance of the first bend in the tube. After the bend is performed the bending tools 12 are released from the tube and the carriage 22 is manually advanced toward the bending tools until the cam surface 72 on the indexing cam 70 engages and rides up onto the inclined surface 73 of a first cam lifter 17. This rotates the cam shaft 15° which is sufficient to carry the finger 68 out of the drum recess, as shown in FIG. 8. At this time a cable 74, connected to the movable detent 69 (FIG. 10) and to a spring wound reel 75 (FIG. 1), pulls the indexing slider rearwardly, the detent 69 then abutting the flange 57 adjacent to the next succeeding drum 56 to stop further movement of the slider rearwardly. Continued forward movement of the carriage causes the indexing cam 70 to ride off the engaged cam lifter 17 and a spring 76 (FIG. 5) seeks to return the cam shaft 63 to its initial position. The cam shaft cannot, however, at this time return to its initial position because the finger 68 abuts the surface of the related drum 56. The carriage is now moved in a rearward direction until the lug 67 on the indexing slider abuts the front face of the cam lifter 17. The tube is now positioned longitudinally for the next bend but it still remains to be rotationally indexed. This is done by rotating the sleeve and drums thereon until the finger 68 is received in the recess 58 of the drum. This engagement now locks the tube "S" in its second bend position and the requisite bending may be performed. The foregoing operations are repeated for each succeeding bend.

When the last of several bends has been performed in the tube, the tube can be removed and the carriage is then moved forward again to carry the cam surface 72 on the indexing cam 70 into engagement with a cam surface 77 on the hi-lift cam or block 18. This rotates the cam shaft 63 to a greater degree (20°) than it was lifted by the cam lifters 17, thus carrying the finger 68 clear of the drum recess and of the drum flanges 57, and causing the movable detent 69 to swing into a position where it will not effectively engage flanges 57. This position of the detent is illustrated in dotted lines in FIG. 10. Such maximum rotation of the cam shaft operates to release a clutch 78 (FIGS. 3 and 11 to 15a) carried in part on the cam shaft 63. The clutch is comprised of two cooperating parts, one being a cam plate 79 secured to the carriage and the other being a clutch sleeve 80 keyed to shaft 63.

The cam plate 79, best shown in FIG. 15a, includes a flange 81 that is arched as shown and has a material portion rearwardly of said flange cut away to provide a reduced area as indicated at 82. This reduced area has an overhang lip 83, rearwardly of the flange 81, defining a shoulder 84.

As best shown in FIG. 14, the clutch sleeve 80 is of predetermined length and it has on the outside of its body 85, at one extreme end thereof, an external flange 86. Spaced from said flange is an external quadrant flange 87, one end of which presents a shoulder 88.

When assembled with the stop plate 79, a segment of the quadrant flange 87 normally lies to the rear of stop plate lip 83 (FIG. 12) and abuts same. A spring 89 (FIG. 3) normally urges the clutch sleeve 80 in a direction toward the stop plate. During normal indexing of the carriage 22, as when the cam surface 72 on the indexing cam 70 rides up on a cam lifter 17, the shaft 63 is rotated about 15°. This amount of rotation is not sufficient to carry the quadrant flange 87 downwardly clear of lip 83. However, when the carriage is advanced following the last bend in the tube and the indexing cam 70 rides up on the cam surface 77 of stop block 18, the shaft 63 is rotated about 20°. This is sufficient to carry the quadrant flange 87 downwardly clear of lip 83 whereupon spring 89 thrusts the clutch sleeve 80 forwardly so as to carry the quadrant flange into abutment with the stop plate flange 81 and locate its shoulder 88 beneath and in abutment with the lip shoulder 84. This holds the shaft 63 in its maximum rotated position so as to hold the indexing finger 68 clear of the drum recesses 58 and clear of the spacer flanges 57 between the drums. The cable 74 now winds on its spring wound reel 75 so as to pull the indexing slider 65 back toward the rear end of the carriage.

The carriage may now be moved manually rearwardly (away from the bending tools) until the indexing slider lug 67 is carried into abutment with the re-set stop 19 whereupon continued rearward movement of the carriage causes the indexing slider to advance along its shaft 63 toward the forward end of the carriage and into abutment with the clutch sleeve 80 with sufficient impact to dislodge the quadrant flange shoulder 88 from beneath lip shoulder 84. The spring 76 (FIG. 5) then functions to return shaft 63, indexing slider 65 and clutch sleeve 80 to their initial start positions. The indexing apparatus is now reset to start a series of like bends in another length of tubing "S" that is now mounted in chuck 33. The indexing slider 65 may be reset at will upon manual operation of a hand lever 90 carried by the indexing cam 70.

Although I have described a preferred embodiment of my invention, in considerable detail, it will be understood that the description thereof is intended to be illustrative, rather than restrictive, as details of the structure may be modified or changed without departing from the spirit or scope of the invention. Accordingly, I do not desire to be restricted to the exact construction described.

I claim:

1. A plane of bend selector comprising, in combination, an elongated guide frame mounted on a bending machine frame, a plurality of stop elements disposed longitudinally along said guide frame, a carriage slidable on said guide frame, a rotatable sleeve mounted in said carriage, means carried by said sleeve to engage with and hold a length of tubular stock to the sleeve, indexing elements carried by said sleeve, and means on the carriage operable upon engagement with selected stop elements to engage with said indexing elements to limit rotation of the sleeve and stock therein into a predetermined position.

2. The apparatus recited in claim 1, in which indexing element release means is operably associated with the stop element engaging means on the carriage.

3. The apparatus recited in claim 1, in which the indexing elements comprise drums rotatably adjustable on the sleeve.

4. The apparatus recited in claim 1, in which the operable means comprises latch means arranged to engage said indexing means.

5. The apparatus recited in claim 4, in which the indexing means comprises a plurality of positionable drums on the sleeve each having a shoulder thereon and the latch means is positionable for selective engagement with the shoulders.

6. The apparatus recited in claim 4, in which clutch means is provided to release the latch means for resetting.

7. The apparatus recited in claim 1, in which the latch means is actuable by engagement of means associated therewith with the stop means.

8. The apparatus recited in claim 1, in which the indexing means is comprised of a series of drums on the sleeve and the operable means is selectively engageable with successive drums.

9. The apparatus recited in claim 1, in which the means operable upon engagement with selected stop means is comprised of latch means slidable on a shaft and spring means to control sliding of the latch means in one direction.

10. The apparatus recited in claim 9, in which the spring means comprises a spring wound reel and a cable secured thereto and to the latch means.

References Cited

UNITED STATES PATENTS 2,382,745  8/1945  Powers _____ 72—156
3,181,323  5/1965  Bos _____ 72—26

RONALD D. GREFE, Primary Examiner

U.S. Cl. X.R.

72—27